July 14, 1970     H. D. MORRIS ET AL     3,520,196

FLUID ROTOR ANGULAR ACCELEROMETER

Filed March 3, 1966     4 Sheets-Sheet 1

INVENTORS
Harold D. Morris
BY Joseph T. Buckingham

Attorneys

INVENTORS
Harold D. Morris
Joseph T. Buckingham
Attorneys

United States Patent Office 3,520,196
Patented July 14, 1970

1

3,520,196
FLUID ROTOR ANGULAR ACCELEROMETER
Harold D. Morris, Orinda, and Joseph T. Buckingham, Concord, Calif., assignors to Systron-Donner Corporation, Concord, Calif., a corporation of California
Filed Mar. 3, 1966, Ser. No. 531,457
Int. Cl. G01p 15/08
U.S. Cl. 73—516   7 Claims

ABSTRACT OF THE DISCLOSURE

Fluid rotor angular accelerometer having a pivotally mounted paddle supported about its pivot axis so that there is substantially no constraint about its pivot axis in the absence of a restoring force supplied by electrical means which senses the position of the paddle.

---

This invention relates to angular accelerometers and more particularly to fluid rotor angular accelerometers.

Angular accelerometers have heretofore been provided. However, with such angular accelerometers, it has been difficult to measure low level angular accelerations, particularly in the presence of linear acceleration and high vibration levels. It also has been difficult to provide such accelerometers which have a high range and which are capable of operating even in the presence of high vibration, shock and linear acceleration inputs. There is, therefore, a need for a new and improved angular accelerometer.

In general, it is an object of the present invention to provide a fluid rotor angular accelerometer which overcomes the above named disadvantages.

Another object of the invention is to provide an angular accelerometer of the above character which is particularly adapted for measuring low level angular accelerations in the presence of linear acceleration and high vibration levels.

Another object of the invention is to provide an angular accelerometer of the above character which is particularly adapted for high ranges of acceleration in the presence of high vibration, shock and linear acceleration inputs.

Another object of the invention is to provide an angular accelerometer of the above character which has a very minute moving assembly and which is supported by the fluid itself or, in other words, is neutrally buoyant.

Another object of the invention is to provide an angular accelerometer of the above character in which the moving system is symmetrical.

Another object of the invention is to provide an angular accelerometer of the above character in which the moving system is immersed in the fluid mass.

Another object of the invention is to provide an angular accelerometer of the above character in which the volume of fluid mass utilized is very small.

Another object of the invention is to provide an angular accelerometer of the above character in which the path for the fluid mass is isolated from external temperature changes.

Another object of the invention is to provide an angular accelerometer of the above character which can be readily manufactured.

Additional objects and features of the invention will appear from the following description in which the preferred embodiments are set forth in detail in conjunction with the accompanying drawings.

Referring to the drawings:

FIG. 1 is a top plan view of an angular accelerometer

2 incorporating the present invention particularly adapted for measuring high ranges of acceleration.

Figure 1:
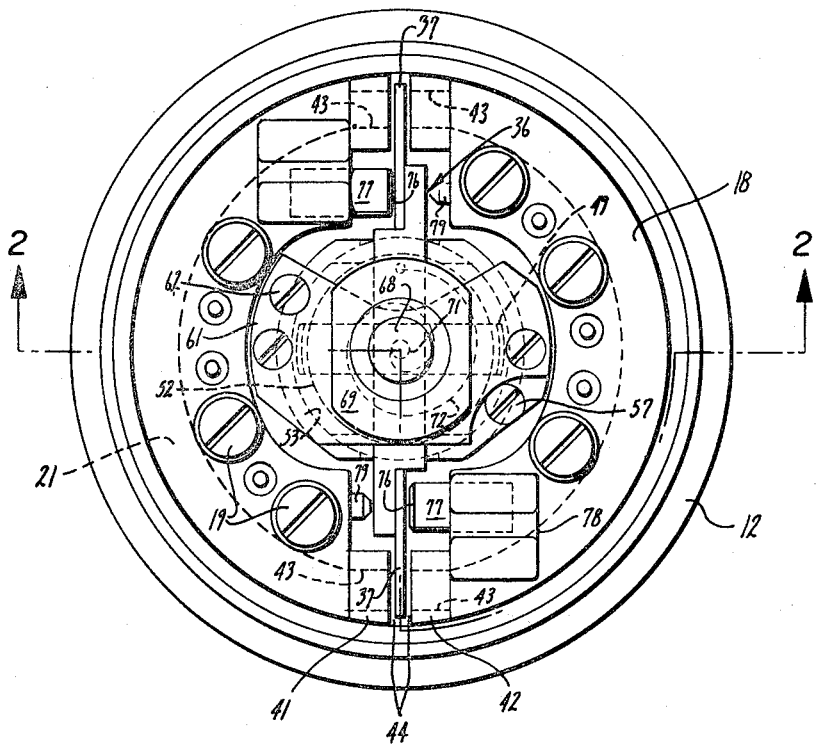

In general, the angular accelerometer consists of means which forms an endless passageway. A fluid mass is disposed in the passageway. A paddle is disposed in said fluid in said passageway for measuring forces applied to the paddle by the fluid mass as the fluid mass is accelerated. Means is provided for pivotally mounting the paddle. Means is also provided for sensing the position of the paddle and means is utilized for applying a restoring force to the paddle equal to the force applied to the paddle by the fluid mass.

More particularly as shown in the drawings, the angular accelerometer consists of a case or housing 11 which is formed by a body 12 and upper and lower covers 13 and 14 which are secured to the body 12 by suitable means such as cement. A flanged mounting block 16 is disposed within the case and is secured to the body 12 by suitable means such as screws 17. A rotor block 18 is also mounted within the case and is secured to the mounting block 16 by suitable means such as screws 19. The rotor block 18 is provided with upper and lower annular flanges 18a and 18b which cooperate with the inner side wall of the body 12 to provide an annular endless fluid passageway 21 which is substantially rectangular in cross-section as can be seen from FIG. 2 of the drawings.

A retaining member 22 is mounted within the top cover 13 and serves to hold the flexible diaphragm 23 in place in the cover. The member 22 is provided with a hole 24 which establishes communication with a space 26 below the retaining member 22 and a space 27 above the retaining member 22 but below the diaphragm 23. A space 28 between the diaphragm 23 and the upper part of the cover 13 is vented to the atmosphere through a hole 29 provided in the top of the cover 13.

The annular passage 21, the space 26 and the space 27 are filled with a suitable fluid such as oil. Two oils found particularly satisfactory are Dow-Corning 200 and Fluorolube which are both silicone oils which have the advantage that they are relatively inert and will not react with any metal which is used in the accelerometer. In addition, the fluids are desirable because their viscosity changes very little with temperature.

The case or housing 11 containing the fluid passageway 21 with the fluid therein is adapted to be subjected to angular acceleration which tends to cause the inertial fluid mass to shift or tend to move within the passageway 21. Means is provided for sensing the force created by the tendency of the fluid inertial mass to move and also to restrain or inhibit movement of the inertial fluid mass within the passageway 21. This means includes a paddle or vane 36 which is disposed in the fluid in the passageway 21. As shown, the paddle 36 is provided with substantially planar end portions or members 37 on opposite ends. Both end members 37 are disposed in the fluid in the passageway 21. Fittings 41 and 42 are disposed on each side of the end members 37 and 38 and are provided with circular openings 43 which communicate with the passageway 21 and form a continuation of the passageway 21. A small space 44 is provided between the fittings 41 and 42 between which the end members 37 are disposed. It will be noted that the space 44 is sufficiently large to permit slight movement of the paddle in a direction which is at right angles to the plane of the end members 37 and in the direction of movement of the fluid inertial mass contained within the passageway 21. As will be noted, the end members 37 are of a size which is greater than the cross-sectional area of the openings 43 in the fittings 41 and 42 so that they can constrain or prevent fluid flow in the passageway 21.

Means is provided for pivotally mounting the paddle 36 and includes upper and lower pivot and jewel mountings 46 and 47. The paddle 36 is part of a moving and restoring system which also includes a rectangular moving coil 49 which forms part of a torque motor. The moving coil 49 is disposed in an air gap 51 formed between a cylindrical magnet 52 and a magnet mount 53. The magnet mount 53 is formed of a non-magnetic material. The magnet 52 is secured to the magnet mount 53 by suitable means such as a pin 54 which extends through the magnet 52 in the magnet mount 53 in a direction which is substantially at right angels to the normal position of the plane of the rectangular moving coil 49.

The magnet mount 53 is mounted within a barrel-shaped yoke 56 formed of a suitable magnetic material such as soft iron and is secured thereto by suitable means such as screws 57. The yoke 56 is provided with flanged portions 56a which rest upon an annular shoulder 58 formed in the mounting block 16. The yoke 56 is secured to the mounting block 16 by suitable means such as screws 59. The magnet mount 53 is provided with spaced upstanding post-like portions 53a. A bridge plate 61 is secured to the post-like portions 53a by suitable means such as threaded screws 62.

The upper pivot and jewel mounting 46 is carried by the bridge plate 61, whereas the lower pivot and jewel mounting 47 is carried by the magnet mount 53. The lower pivot and jewel mounting 47 consists of a mounting member 66 which is adjustably threaded into the magnet mount 53 and carries a jewel (not shown). It also includes a pivot member 67 which seats within the mounting member 66 and is secured to the lower side of the rectangular moving coil 49. The upper pivot and jewel mounting assembly 46 consists of a mounting member 68 which is threaded into a flanged member 69 secured to the bridge plate 61. The mounting member 68 also carries a jewel (not shown) and receives a pivot member 71 which is secured to the top side of the moving coil 49 directly opposite the point at which the pivot member 67 is secured. A hair spring 72 is disposed about the pivot member 71 and is secured to the moving coil and is provided for supplying current to the moving coil.

A pickoff coil or transformer 76 is disposed adjacent one of the end members 37 carried by the paddle 36 and lies in a plane which is substantially parallel to the plane of the adjacent end member 37 and in relatively close proximity thereto. This pickoff coil 76 is carried by a cylindrical block of a suitable insulating material such as an epoxy. The member 76 is mounted in a block 78 secured to the rotor block 18. A similar mounting member 77 and block 78 are provided adjacent the other end member 37 so that the entire accelerometer is balanced. Stops 79 are also secured to the rotor block 18 and serve to limit the amount of angular travel of the paddle 36.

An electronics module is mounted within the cover 14 of the accelerometer. Preferably, the electronics is of the type disclosed in Morris Pat. 3,074,279 in which the pickoff coil 76 is connected to an oscillator and in which the output of the oscillator is fed into a detector which has its output amplified by an output amplifier 14. The output of the amplifier is fed through a load resistance and through a feedback path to the moving coil 49 to supply a restoring force to the moving coil.

Operation and use of the accelerometer shown in FIGS. 1 and 2 may now be briefly described as follows. Let it be assumed that the angular accelerometer has been placed in an environment in which it is to measure angular acceleration about its sensitive axis, namely, an axis coincident with the axis of rotation of the fluid rotor which is formed by the fluid in the endless annular passageway. When the accelerometer is subjected to angular acceleration about the sensitive axis, a positive error signal is generated by the accelerometer as the fluid rotor (due to its inertia) tends to lag behind the accelerating case or housing 11 of the instrument. The paddle 36 with its end members 37 disposed in the fluid path of the fluid rotor serves to constrain the fluid rotor to cause it to move with the case of the accelerometer. As soon as there is any attempt by the fluid rotor to shift the position of the paddle 36, a change in position of the end members is sensed by the pickoff coil 36. As explained in Morris Pat. 3,074,279, since the pickoff coil is excited by the oscillator electronics, the oscillator output is modulated by the variation in spacing between the end member 37 and the pickoff coil. This is detected and changed to a high level current. The output amplifier brings the power level up to where sufficient current is supplied to the moving coil to restore the paddle to its zero position, preventing the fluid rotor from shifting in position and causing the fluid rotor to move with the case of the accelerometer. Thus, it can be seen that the power amplifier produces a power level which is sufficient to retain the paddle in its zero position and a current flows which actually represents the acceleration acting upon the fluid rotor. For this reason, the output current is not a function of any resistance in the output circuit but is only a function of the acceleration which the accelerometer is undergoing.

In the foregoing accelerometer, it can be seen that the fluid rotor serves as the inertial mass which is closely coupled to an almost weightless, low inertial torque motor operating in a closed loop fashion to sense the angular motion of the fluid rotor and to provide the torque necessary to constrain the rotor to move with the case of the accelerometer. Thus, the paddle supplies the force necessary to accelerate the fluid mass so that it moves with the case and prevents it from circulating. The torque motor assembly is neutrally buoyant because the mass of the moving parts is purposely minimized. For example, the torque motor assembly which includes the moving coil and the paddle 36, has very low mass because it is formed of relatively light metals as, for example, aluminum and magnesium. Since this is the case, the mass is almost supported by the dense fluid used for the inertial mass, and can by design be made wholly supported, or neutrally buoyant.

It can be seen that the moving parts of the torque motor are symmetrical, and are carefully balanced in and out of the fluid to assure a minimum "$g$" sensitivity of the finished accelerometer. The use of the neutrally buoyant torque motor rather than a neutrally buoyant mass reduces the balance problem by several orders of magnitude in initial value and, as well, makes the "$g$" sensitivity of the unit almost independent of variation of fluid density with temperature. The use of a neutrally buoyant sensor also makes it possible to use the pivot and jewel mountings for relatively high environment because of the very low suspended mass, e.g., 500$g$ for shock; 46$g$ for vibration; and 200$g$ for linear acceleration.

Figure 2:
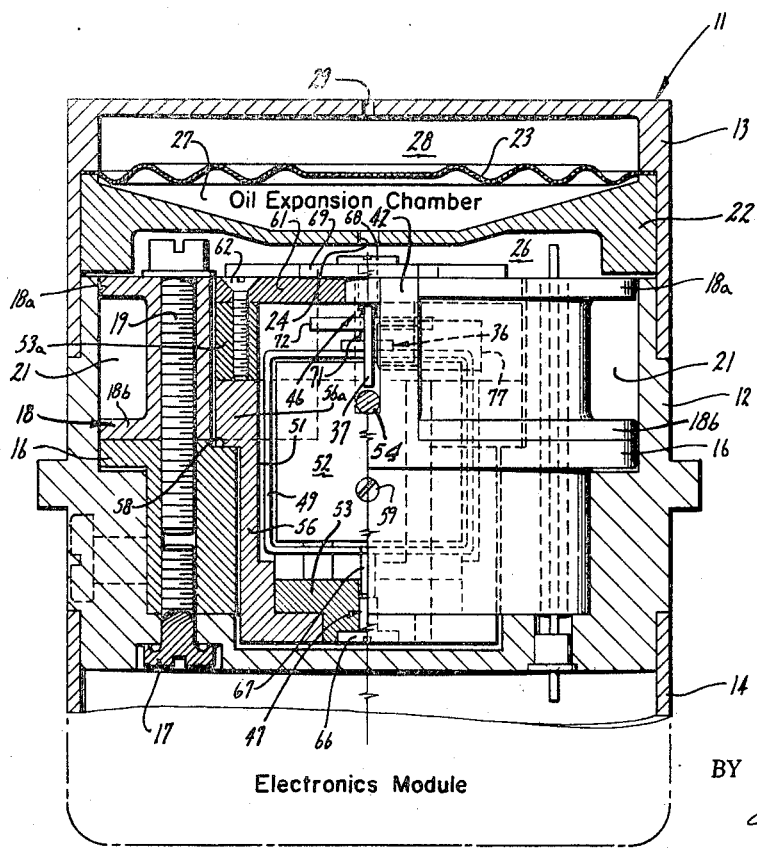
FIG. 2 is a cross-sectional view of the accelerometer as shown in FIG. 1 taken along the line 2—2 of FIG. 1.

In the accelerometers shown in FIGS. 1 and 2, the fluid path or passageway has been reduced to a very small diameter. In fact, the diameter is such that the moving and restoring system which is utilized in the accelerometer protrudes into both sides of the oil path. Because of this geometry, ranges from ±50 to ±150 radians/second$^2$ can be readily constructed.

Figure 3:
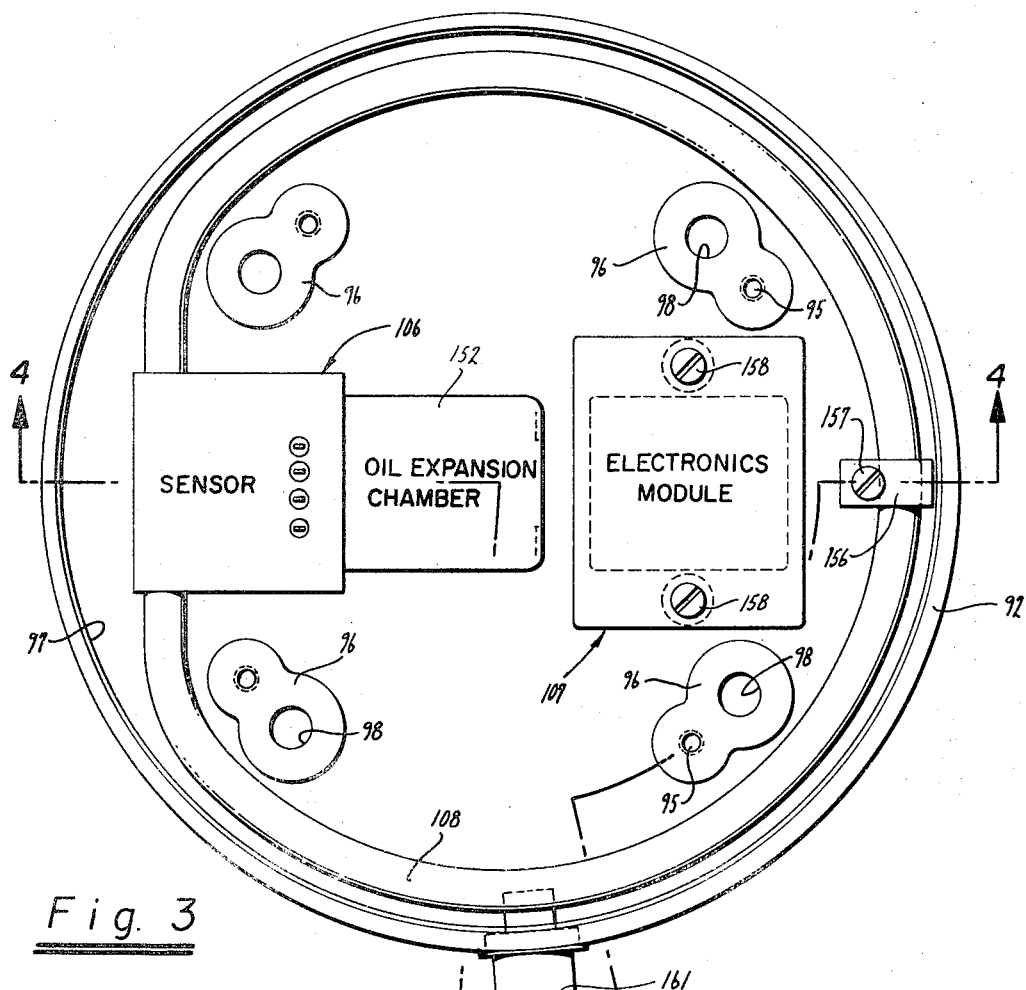
FIG. 3 is a top plan view of another embodiment of an angular accelerometer incorporating the present invention particularly adapted for sensing intermediate ranges of angular acceleration.
Figure 4:
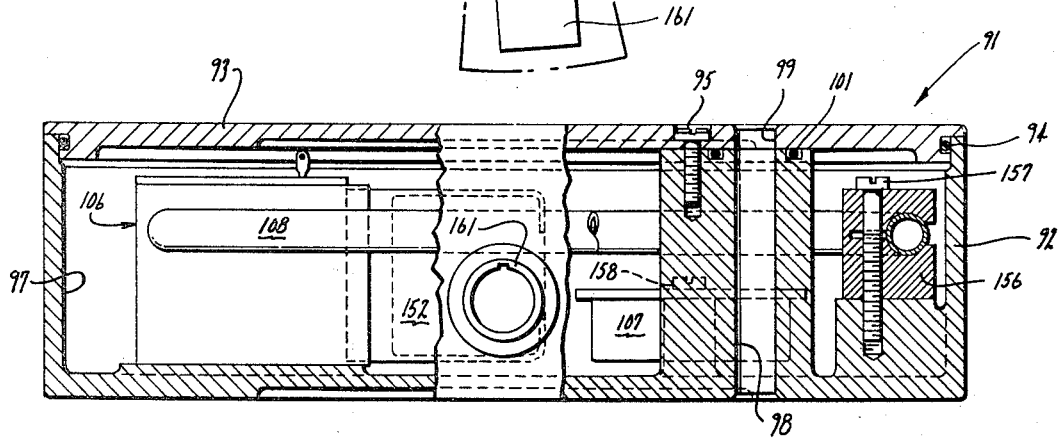
FIG. 4 is a cross-sectional view taken along the line 4—4 of FIG. 3.

Another embodiment of the fluid rotor angular accelerometer is shown in FIGS. 3 and 4. The construction of the angular accelerometer shown in FIGS. 3 and 4 can be of a type which can be classified as a medium range angular accelerometer, whereas the construction shown in FIGS. 1 and 2 can be classified as a high range angular accelerometer because of its relatively small diameter.

The medium range angular accelerometer shown in FIGS. 3–6 consists of an external case or housing 91. The case or housing 91 consists of a cylindrical body 92 and a cover 93 secured thereto by screws 95. Suitable sealing means is provided between the cover 93 and the body 92 in the form of an O-ring 94. The body 92 is formed with a plurality of upstanding bosses 96 within the cylindrical recess 97 provided in the body. The bosses 96 are provided with feed-through mounting holes 98 which are in alignment with holes 99 provided in the cover 93. Suitable means is provided for forming a seal between the recess 97 and the holes 98 and 99 and consists of O-rings 101 disposed in the upper ends of the bosses 96 and engaged by the cover 93.

The accelerometer shown in FIGS. 3–6 also includes a sensor assembly 106, an electronics module 107 and an endless tube 108, which are disposed within the recess 97 of the outer case or housing 91. The sensor 106 contains many parts which are similar to the parts in the accelerometer shown in FIGS. 1 and 2. As can be seen from FIGS. 5 and 6, the sensor assembly 106 consists of a case 111 which is secured to the outer case or housing 11 by suitable means such as screws 112. The case 111 is provided with a recess 113 which is closed by a cover 114. The removable insert 116 of insulating material is provided in the side wall of the case 111 as a sealing plate in case 111.

A torque motor and paddle assembly 118 is mounted within the recess 113 provided in the case 111. It consists of a paddle 119 which is provided with substantially planar end members 121. The paddle 119 is secured to the top side of a rectangular moving coil 122 which is disposed in an air gap 123 formed between a cylindrical magnet 124 and a magnet mount 126. The magnet mount 126 is formed of a non-magnetic material and supports the magnet 124 by suitable means such as a pin (not shown) of the type hereinbefore described in conjunction with FIGS. 1 and 2. The magnet mount 126 is carried within a yoke 127 formed of a suitable magnetic material such as soft iron. The yoke 127 is mounted in a block 128 held in place within the block 128 by screws 129. A bridge plate 131 is carried by the magnet mount 126 and provides a support for the upper pivot and jewel mounting 132 for the torque motor. The lower portion of the magnet mount 126 carries the lower pivot and jewel mounting 133 for the torque motor. The pivot and jewel mountings 132 and 133, as can be seen from the drawing, are substantially identical to the ones hereinbefore described in conjunction with the accelerometer shown in FIGS. 1 and 2 and, therefore, will not be described in detail. The torque motor also includes a hair spring 136 which is utilized for supplying current to the torque or moving coil 122. Another hair spring (not shown) is used around lower pivot and jewel mounting 133 to provide the second electrical connection to moving coil 122.

Means is provided for sensing the position of the paddle 119 and consists of a pickoff coil 141. The pickoff coil is disposed adjacent one of the end members 121 and is mounted upon one end of a cylindrical plug 142 carried in a mounting block 143 formed of a suitable insulating material. The block 143 is secured to the large mounting block 128 by screws 144. A similar block 143 is provided on the other side of the end member 121 and serves as a limit stop for the paddle. The other end member 121 of the paddle 119 is disposed in a slot 146. The slot 146 is in communication with the passage 147 formed in the case 111 extending in a direction substantially at right angles to the plane of the end member 121 disposed in the slot 146. The opposite ends of the tube 108 are mounted in the case 111 and are secured therein. As can be seen from FIG. 5, the internal diameter of the tube 108 is substantially identical to the diameter of the passage 147 provided in the case 111.

The recess 113 within the case 111 as well as the tube 108 is completely filled with a suitable fluid as, for example, Fluorolube, to provide the liquid rotor for the accelerometer. An expansion chamber 152 is provided for the fluid and is mounted on the side wall of the case 111. A hole 153 establishes communication between the recess 113 and the expansion chamber 152.

As can be seen particularly from FIG. 4, the ends of the tube 108 are supported by the case 111 for the sensor assembly 106. Additional means is provided as necessary for supporting the intermediate portions of the tube and consists typically of a tube clamp 156 which is secured to the body 92 by a screw 157. The electronics module 107 is mounted in the outer case 91 and is disposed within the area defined by the tube 108. It is secured to the body 92 by screws 158. The electronics module 107 contains electronics of the type disclosed in Morris Pat. 3,074,279 as described in conjunction with the accelerometer shown in FIGS. 1 and 2. The case or housing 91 is provided with a connector 161 for making suitable connections to the electronics module 107.

The operation and use of this embodiment of our accelerometer is very similar to the accelerometer shown in FIGS. 1 and 2. The principal difference is that the diameter of the fluid rotor has been increased substantially to make it more sensitive to lower ranges of angular acceleration. The sensor 106 with the tube 108 are mounted within the case or housing 91 and for that reason, the entire fluid path and the mechanism are isolated from possible exterior heat sources and thus greatly decrease any sensitivity to differential temperature conditions. In other words, the oil path has been isolated thermally from external influences and, therefore, any temperature gradient across the instrument has been minimized. Although the fluid path in the accelerometer shown in FIGS. 3–6 is substantially circular, there is no requirement that the fluid travel in a circular path. It is only necessary that the path be continuous. The path need not even be in one plane. The only requirement is that there be a finite area within the path for the fluid so that the fluid rotor will be sensitive to angular acceleration.

Figure 5:
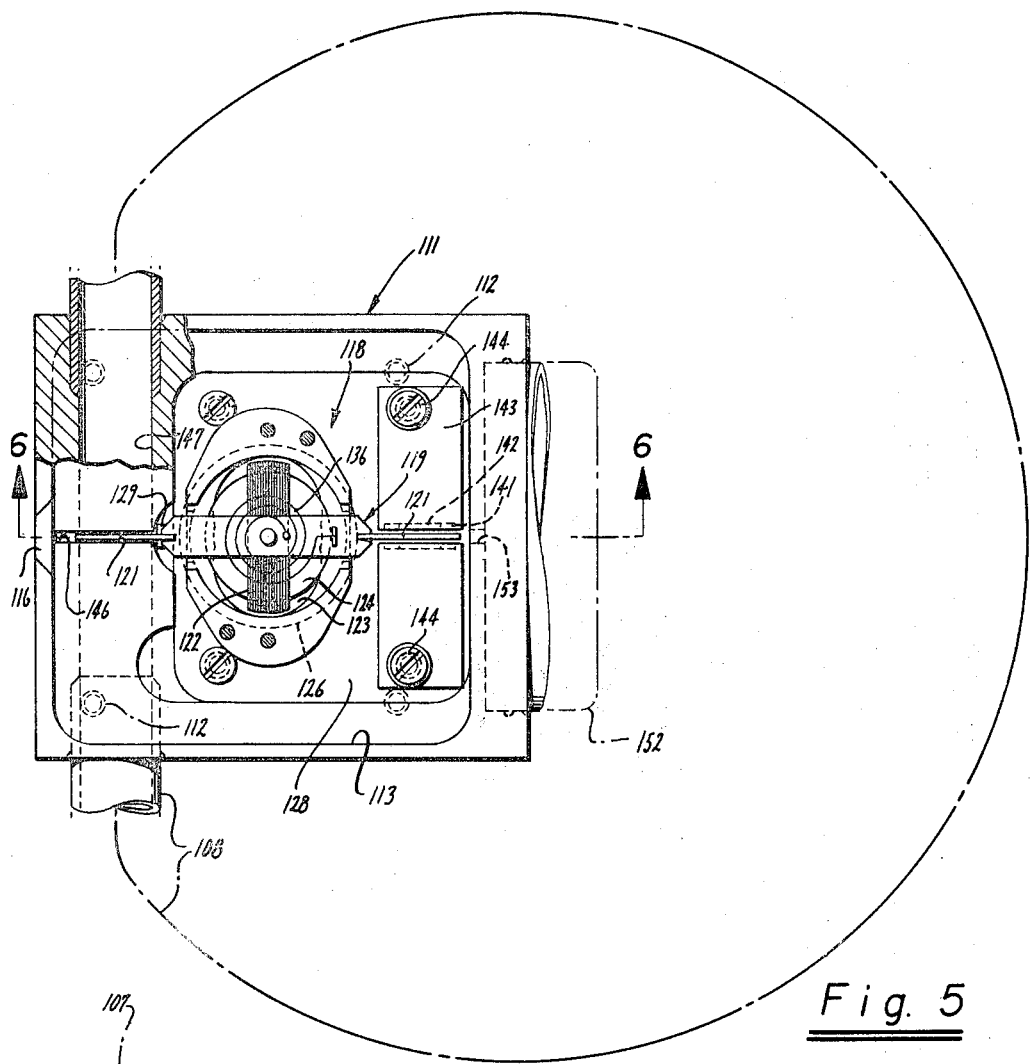
FIG. 5 is an enlarged top plan view, partially in cross-section, of the motion sensing assembly of the accelerometer shown in FIGS. 3 and 4.
Figure 6:
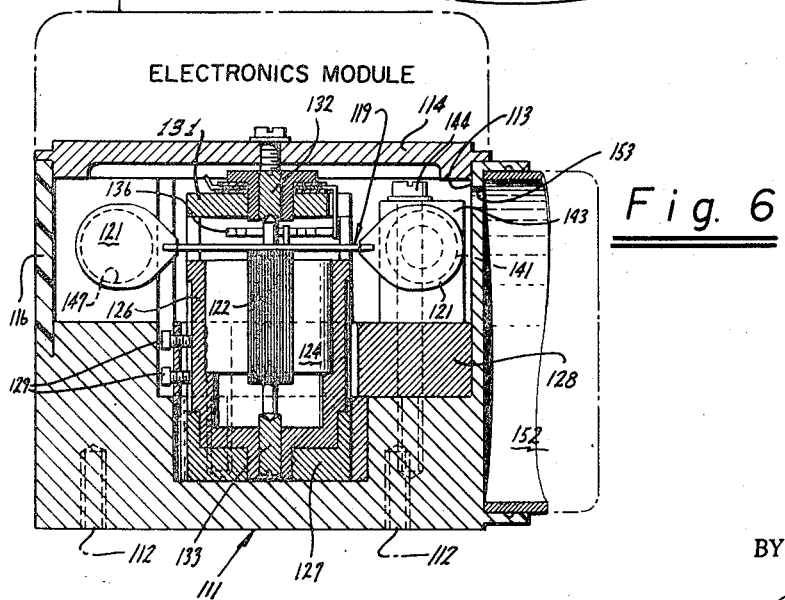
FIG. 6 is a cross-sectional view taken along the line 6—6 of FIG. 5.

In the embodiment of the accelerometer shown in FIGS. 3–5, the torque motor is also substantially neutrally buoyant and also has been kept very small so that it will have a relatively low mass. For this reason, the paddle 119 only breaks the path of the fluid rotor at one point. This has made it possible to sense the movement of the other end of the paddle with the pickoff coil.

In operation when the accelerometer is subjected to angular acceleration about the sensitive axis, a positive error signal is generated when the fluid rotor applies a force to the paddle 119 which is utilized to drive the torque motor in the proper direction to cause the fluid rotor to follow the case and to minimize the position error signal. Thus, as in the previous embodiment of the accelerometer, the paddle serves to constrain or prevent the flow of fluid which forms the fluid rotor.

Figure 7:
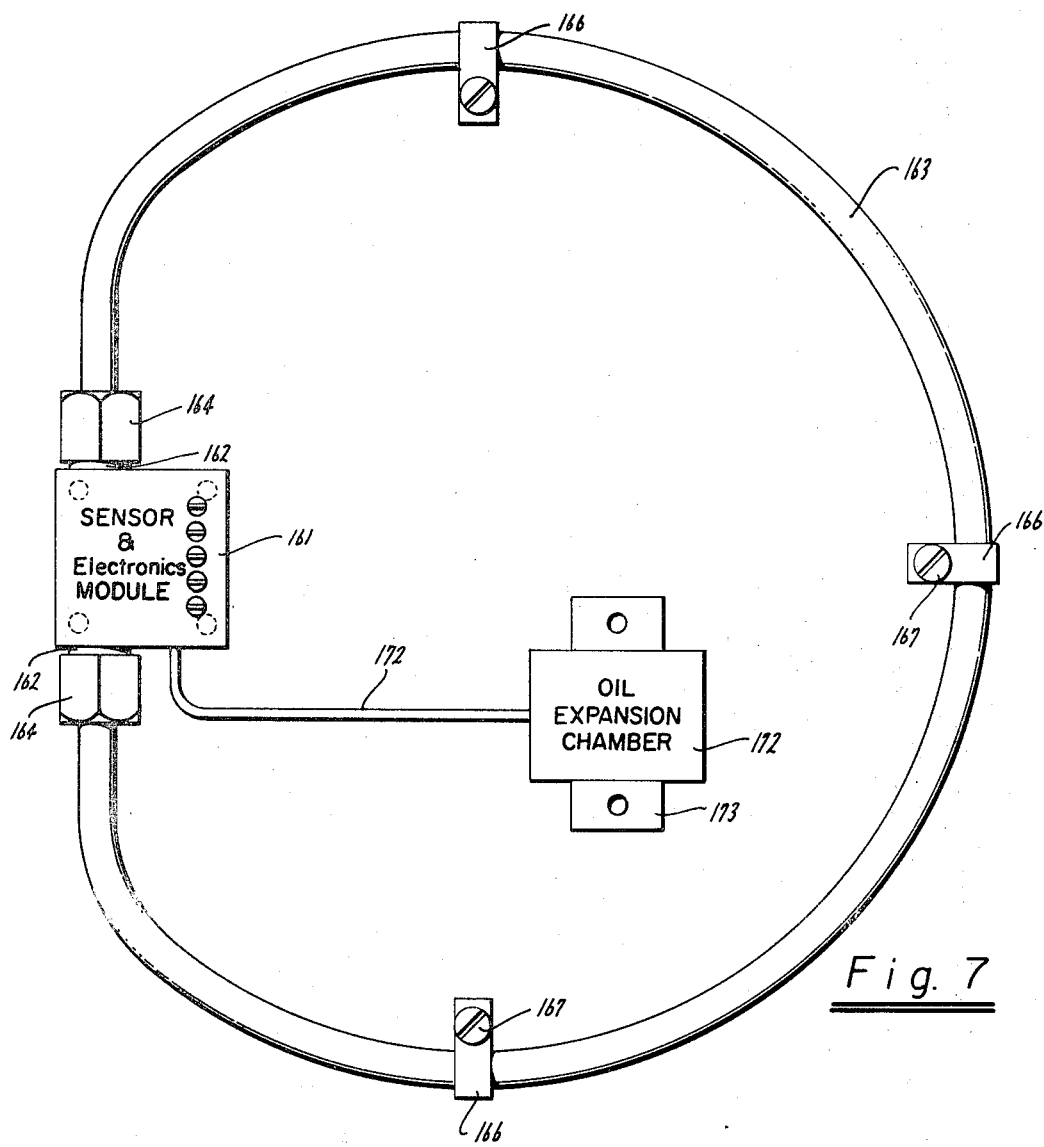
FIG. 7 is still another embodiment of an angular accelerometer incorporating the present invention particularly adapted for sensing low ranges of acceleration.
Figure 8:
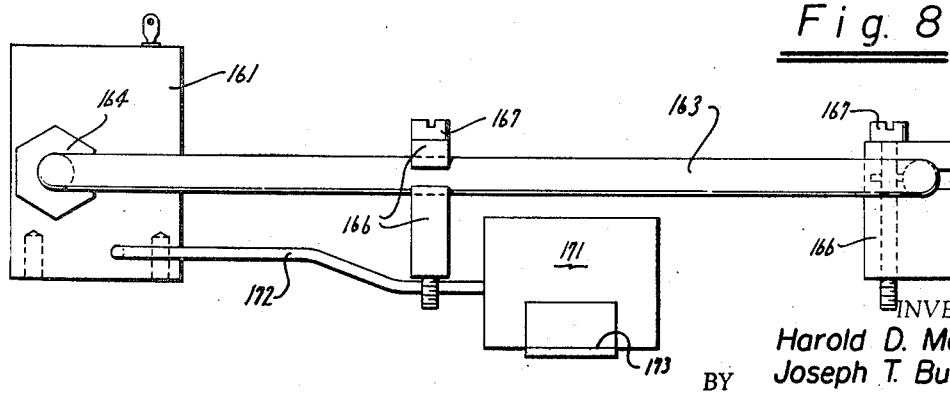
FIG. 8 is a side elevational view of the angular accelerometer shown in FIG. 7.

Still another embodiment of the invention is shown in FIGS. 7 and 8 which can be characterized as a low range fluid rotor angular accelerometer. As can be seen from FIGS. 7 and 8, this embodiment of the accelerometer consists of a combined sensor assembly and electronics module 161. The sensor assembly included in the module 161 is substantially identical to the sensor assembly 106 provided in the embodiment of the accelerometer shown in FIGS. 3–6. In addition, the electronics module incorporated within the module 161 includes the same electronics as in the electronics module 107 in the embodiment shown in FIGS. 3–6, and in the embodiment shown in FIGS. 1 and 2. Because there is no height limitation with the low range accelerometer, both of these assemblies have been placed in the single module 161. The module 161 is provided with a passage (not shown) which is in communication with male fittings 162 provided on opposite sides of the module 161. The ends of large tube 163 are connected to the fittings 162 by nuts 164. Thus, the tube 163 with the passage within the module 161 provides an endless path which is filled with a fluid to serve as the fluid rotor for the angular accelerometer. Intermediate portions of the tube are supported in a suitable manner such as by split blocks 166 and screws 167. An expansion chamber 171 is provided for the fluid filled module 161 and can be located in any desired position. It is connected to the module 161 by a pipe 172. The chamber 171 is provided with suitable brackets 173 to facilitate mounting the chamber upon the device upon which the accelerometer is mounted.

Operation and use of the accelerometer shown in FIGS. 7 and 8 is very similar to that hereinbefore described. The principal difference is that the accelerometer shown in FIGS. 7 and 8 is usable for the measurement of extremely low range angular accelerations as, for example, less than 1 radian/second$^2$. As in the previous embodiments, a sensing medium of a suitable fluid, such as silicone fluid, is utilized as a seismic inertial mass. This inertial mass is contained in an annular tube or toroid which is blocked by a servoed torque generator. Angular acceleration acting upon the axis perpendicular to the plane of the toroid or annular tube accelerates the annular tube tending to leave the inertial fluid mass behind if it were not for the accelerating torque applied to the mass by the torque motor. Since the torque supplied is servo controlled, an electrical signal output is generated by the accelerometer which is exactly proportional to the acting angular acceleration upon the accelerometer.

Since the sensor and the electronics of the accelerometer shown in FIGS. 7 and 8 is located in a small module 161, the tubing 163 can take any size or shape. It can be constructed of any suitable material and can be bent in various shapes if it is necessary to avoid obstructions in the area of mounting for the accelerometer. The full input range of the accelerometer is determined by the amount of the effective fluid mass located in the tubing. For that reason, range changes can be accomplished merely by changing the diameter of the fluid filled tube. It is only necessary that adequate tubing support be provided to minimize motion induced by vibration and also to eliminate possible temperature gradients over the tubing to therefore keep the fluid density uniform and constant.

In such low range accelerometers, it has been found that measurements as low as 1 radian/second$^2$ can be readily measured. The zero output is very low as, for example, as small as .05% of full range. In addition, the linear acceleration of sensitivity is also very low, e.g., .05% of full range. On the other hand, the bandwidth is relatively high because of the capability of the high gain servo which accurately reflects pressure changes or the tendency of the fluid rotor to move. The bandwidth has been sufficiently wide so that the accelerometer can be utilized as a servo stabilization device. In other words, the accelerometer will sense imperfections in a positioning servo and produce feedback signals to provide a more perfect operation of the positioning servo. In order for it to do this, the accelerometer must have a bandwidth which is wider than the positioning servo itself.

In all the embodiments of the accelerometer hereinbefore described, a very high voltage output can be produced representing the acceleration being measured. Thus, it is actually possible to provide accelerometers having a ±100 volt output at a 1 radian/second$^2$ range.

All the above embodiments of the accelerometer can operate properly even in the presence of high vibration, shock and linear acceleration inputs. Insensitivity to linear acceleration is obtained because the moving system is balanced about the pivot point for the moving system. The torque motor and the paddle are also both balanced.

It is apparent from the foregoing that there has been provided a fluid rotor angular accelerometer which is capable of being utilized for high range measurements, medium range measurements and low range measurements. The accelerometer can take many configurations so that it is particularly adapted for use in many different environments. Also, the accelerometer particularly fulfills a need for measuring low level angular accelerations.

We claim:

1. In an angular accelerometer, means forming an endless passageway, a fluid mass disposed in said passageway, a paddle, means pivotally mounting the paddle outside of the passageway about a pivot axis, the paddle having a planar element disposed in said pssageway in a direction at substantially right angles to the normal path of movement of the fluid mass in the passageway, means for sensing the position of the planar element in the passageway, said fluid mass serving to apply a force to the planar element of the paddle when the angular accelerometer is subjected to angular acceleration, and electrical means connected to the means for sensing the position of the paddle for applying a restoring force directly to the paddle which is proportional to the force applied to the planar element by the fluid mass as the angular accelerometer is subjected to angular acceleration to constrain the movement of the fluid mass in said passageway, said paddle being supported about its pivot axis so that there is substantially no constraint about its pivot axis in the absence of the restoring force supplied by the electrical means.

2. An accelerometer as in claim 1 wherein said paddle is balanced and is neutrally buoyant in said fluid mass.

3. An accelerometer as in claim 1 wherein said paddle is provided with planar elements at opposite ends and wherein both of said planar elements are disposed in said passageway at spaced points.

4. An accelerometer as in claim 1 wherein said means for sensing the position of the paddle includes pickoff means for sensing the position of the planar element which is not disposed in the fluid passageway.

5. An accelerometer as in claim 1 wherein said means forming an endless passageway includes a case having a passage therein and a length of tubing with the ends of the tubing mounted in said passage so that they are in communication therewith to form the endless passageway.

6. An accelerometer as in claim 5 wherein said case and said tube are enclosed in an outer case.

7. An accelerometer as in claim 3 wherein said planar element has a size which is greater than the cross-sectional area of the passageway to prevent free circulation of the fluid mass in the passageway.

References Cited

UNITED STATES PATENTS

| 2,759,157 | 8/1956 | Wiancko | 73—516 XR |
| 2,778,623 | 1/1957 | Statham | 73—516 |
| 2,778,624 | 1/1957 | Statham | 73—516 |
| 2,778,905 | 1/1957 | Statham | 73—516 |
| 2,878,352 | 3/1959 | Statham | 73— 505 XR |
| 2,963,244 | 12/1960 | Statham | 73—505 XR |
| 3,131,565 | 5/1964 | Amlie | 73—516 |
| 3,165,934 | 1/1965 | Smoll et al. | 73—516 |

JAMES J. GILL, Primary Examiner